Sept. 25, 1928.

F. LIPKE 1,685,092

DIRIGIBLE HEADLIGHT

Filed June 11, 1927

Frank Lipke
INVENTOR.

BY George J. Itoch
ATTORNEY.

Patented Sept. 25, 1928.

1,685,092

UNITED STATES PATENT OFFICE.

FRANK LIPKE, OF MISHAWAKA, INDIANA.

DIRIGIBLE HEADLIGHT.

Application filed June 11, 1927. Serial No. 198,019.

The invention relates to dirigible headlights particularly adapted for use on motor driven vehicles, and has for its object to provide a device of this character which is pivotally mounted in a manner whereby as the vehicle makes a turn said light, incident to the weight thereof and the manner of pivotally mounting the same, will swing to one side whereby light rays will be projected forwardly of the vehicle in the direction of turn thereof. The pivotal mounting is such whereby when the vehicle assumes a straight course, the lamp will return to normal longitudinal relation with the vehicle incident to gravity.

A further object is to provide a momentum and gravity actuated dirigible light pivotally mounted on an upwardly inclined pivot bolt, and having a lamp casing to the inclined side of the pivot bolt, the weight of which will return the dirigible headlight to normal longitudinal relation to the vehicle after the completion of a turn in either direction.

A further object is to provide the inclined bolt with a supporting bracket, which supporting bracket is carried by a contractible collar clamped around the filling opening flange of the radiator.

A further object is to provide the lamp casing with a forwardly and downwardly extending arm terminating in an inclined U-shaped member, the arms of which are pivotally mounted on the inclined bolt, thereby allowing the supporting arm to be formed from a single piece of material, as well as its bearing part on the bolt.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
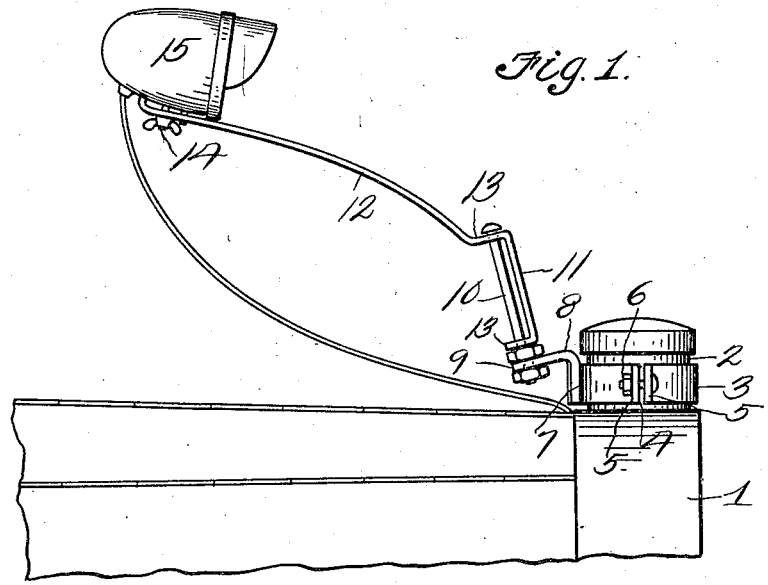
Figure 1 is a side elevation of a portion of the forward end of a conventional form of automobile, showing the lamp applied thereto.

Referring to the drawing the numeral 1 designates the radiator of a conventional form of automobile, and 2 the radiator opening flange, on which the device is supported. Surrounding the radiator flange is a contractible band 3 having a split 4 and outwardly extending ears 5, through which extends a securing bolt 6, and by means of which bolt the band 3 may be contracted into close binding engagement with the radiator opening flange 2. The rear side of the band 3 has secured thereto, by means of brazing at 7, an angularly shaped bracket 8, the arm 9 of which inclines downwardly and rearwardly and supports a rearwardly and upwardly extending arm 10 on which is pivotally mounted the U-shaped portion 11 of the upwardly and rearwardly extending arm 12. The arm 10 extends through the ears 13 of the U-shaped member 11, therefore it will be seen that the U-shaped member 11 and the upwardly and rearwardly extending arm 12 may be formed from a single piece of material bent to form.

Figure 2:
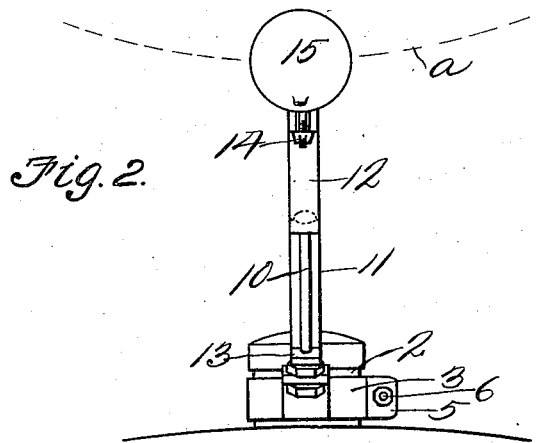
Figure 2 is a rear elevation of the lamp.

Secured to the upper side of the upwardly and rearwardly extending arm 12 by means of the bolt 14 is a lamp 15 of a conventional form, and which lamp projects light rays forwardly and downwardly in relation to the automobile. It will be noted that by inclining the arm 10 upwardly and rearwardly, when the arm 12 with the lamp 15 swings to either side, it will swing on the arc $a$, Figure 2, which will cause a slight raising of the lamp, consequently when the automobile assumes a straight course, said lamp will be returned by gravity to its normal longitudinal relation to the automobile as shown in Figures 1 and 2. In operation, as the vehicle makes a turn to the right or left the momentum of the vehicle and centrifugal force incident to the turning operation will swing the lamp on its pivotal point away from the direction of turn, consequently the light rays will be projected on the roadway forwardly of the vehicle. After the vehicle has made the desired turn to either the right or the left, and the centrifugal force incident to the turn is relieved, the lamp immediately assumes its longitudinal position in relation to the longitudinal center of the vehicle, whereby the light rays will be projected on the roadway ahead of the vehicle.

From the above it will be seen that a dirigible headlight is provided which is swung to the right or left according to the direction of turn of the vehicle and incident to the centrifugal force or momentum is returned to normal position after making a turn, by gravity, and one wherein the use of complicated control mechanisms, whether manual or automatically controlled are eliminated.

The invention having been set forth what is claimed as new and useful is:

1. A dirigible headlight comprising a bracket, an upwardly and rearwardly inclined arm carried by said bracket, a lamp rearwardly of the inclined arm, an arm carried by said lamp, said arm being pivotally mounted on the upwardly and rearwardly inclined arm.

2. A dirigible headlight comprising a supporting bracket, an upwardly and rearwardly inclined arm carried by said bracket, a U-shaped member pivotally mounted on the upwardly inclined arm, one of the arms of the U-shaped member terminating in a rearwardly extending arm, and a lamp carried by the rearwardly extending arm.

3. A dirigible headlight comprising a stationary bracket, an upwardly and rearwardly inclined arm carried by the bracket, a U-shaped member pivotally mounted on the inclined arm, one of the arms of the U-shaped member being adjacent the upper end of the inclined arm, said last named arm of the U-shaped member terminating in a rearwardly and upwardly extending lamp supporting arm, and a lamp on said last named arm.

In testimony whereof I affix my signature.

FRANK LIPKE.